(12) United States Patent
Sugimoto

(10) Patent No.: US 6,486,936 B1
(45) Date of Patent: Nov. 26, 2002

(54) LIQUID CRYSTAL PANEL WITH SEAL CONTAINING HARD AND SOFT SPACERS

(75) Inventor: Mitsuhiro Sugimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/579,321

(22) Filed: May 25, 2000

(30) Foreign Application Priority Data

May 25, 1999 (JP) ............................................. 11-145316

(51) Int. Cl.[7] .............................................. G02F 1/1339
(52) U.S. Cl. ........................................ 349/155; 349/153
(58) Field of Search ................................. 349/155, 156, 349/157, 151–154

(56) References Cited

FOREIGN PATENT DOCUMENTS

| JP | 63-155128 | | 6/1988 | |
|---|---|---|---|---|
| JP | 3-287127 | | 12/1991 | |
| JP | 4-083227 | * | 3/1992 | ......... G02F/1/1339 |
| JP | 4-163425 | * | 6/1992 | ......... G05F/1/1339 |
| JP | 4-180026 | | 6/1992 | |
| JP | 5-119325 | | 5/1993 | |
| JP | 7-306413 | | 11/1995 | |
| JP | 8-015708 | | 1/1996 | |
| JP | 8-110524 | | 4/1996 | |
| JP | 8-278506 | | 10/1996 | |
| JP | 11-109377 | | 4/1999 | |

* cited by examiner

Primary Examiner—Toan Ton
Assistant Examiner—Timothy Rude
(74) Attorney, Agent, or Firm—Katten, Muchin, Zavis Rosenman

(57) ABSTRACT

In a liquid crystal display panel comprising first and second substrates which are spaced from each other at a predetermined gap, and liquid crystal sealed in the gap between the pair of first and second substrates, the panel gap between the first and second substrates is controlled by two kinds of gap control materials dispersed in a seal material on the outer periphery of said panel. The two kinds of gap control materials consist of a first gap control material of particles softer than an insulating film (back film) and wires disposed on the first substrate, and a second gap control material of particles harder than the insulating film (back film) and the wires disposed on the first substrate, and the maximum particle diameter in consideration of the standard deviation of the first gap control material is set to be larger than the maximum particle diameter in consideration of the standard deviation of the second gap control material.

10 Claims, 3 Drawing Sheets

LIQUID CRYSTAL PANEL WITH SEAL CONTAINING HARD AND SOFT SPACERS

BACKGROUND OF THE INVENTION

1. Field of the Invention

The present invention relates to a liquid crystal display panel, and more particularly, to a liquid crystal panel having a specific material for the gap between a display panel and a back panel such as a TFT substrate or the like.

2. Description of the Prior Art

Recently, liquid crystal panels have been generally popular because they can be manufactured in a thin and light structure having low power consumption, a large display screen and uniform and excellent image quality. Each of these liquid crystal panels is constructed by two substrates which are spaced from each other at a predetermined interval, and liquid filled in the gap between the pair of substrates. It is preferable to keep the gap between the two substrates uniform and suppress gap unevenness in order to obtain liquid crystal display panels having excellent display quality. The gap unevenness occurs due to partial (local) deformation of the substrate caused by press or due to distortion of the substrates caused by expansion of the liquid crystal at high temperatures. Therefore, in order to keep the gap uniform, there has been generally used a method of scattering spherical gap holding materials in the gap between the substrates.

With respect to a direct view type liquid crystal display panel, a liquid crystal display panel for use in a projection type projector for displaying an image display on a large-scale screen through an enlarging lens is particularly required to be compact in size and highly fine in quality. However, it has such a disadvantage that the gap control materials scattered in a display portion area are imaged at the projection time to lower the display quality, or such a disadvantage that irregularity of colors occurs due to dispersion of the panel gap when displays of RGB are combined in a three-plate projection type projector.

In order to solve these disadvantages, it has been required to implement a spacer less panel in which no gap control material is scattered in the display area, and also implement highly-precise gap uniformity.

In the small type liquid crystal display panel for use in the projection type projector as described above, for the purpose of implementing the spacer less design, there is known a method of dispersing a gap control material in only a seal pattern portion (the outer peripheral portion of the panel) to control the panel gap.

However, the method of controlling the gap by only the sealing portion has the following disadvantages: In a press step for panel attachment, the gap control material mixed in the sealing material is excessively pressed in, so that it breaks the wiring pattern under the seal pattern, or it causes the wires to be short-circuited to each other if the wiring pattern under the seal pattern is designed in a multilayer wiring structure. Further, a large dispersion in gap control occurs due to warp/waviness of the substrates or steps of the back film or wires.

Techniques to solve the above disadvantages disclosed in Japanese Laid-open Patent Publication No. Hei-03-287127 (hereinafter referred to as "first publication") and Japanese Laid-open Patent Publication No. Sho-63-155128 (hereinafter referred to as "second publication") are known as prior arts showing conventional liquid crystal panels.

The first publication discloses the technique that the particle diameter of a first spacer is larger than that of a second spacer mixed in a sealing material on the periphery of the panel and the ration of the first and second spacers is specified to obtain a high-contrast display. According to the first publication, as shown in FIG. 1, black spherical resin fine particles having a compressive elastic coefficient of $9.8 \times 10^8$ to $4.9 \times 10^9$ Pa (100 to 500 kgf/mm$^2$) are used as first spacer 23 for controlling the gap, inorganic second spacer 24 is mixed in the sealing material 25, the particle diameter of the first spacer 23 is set to be larger than that of the second spacer 24 and the mixing ratio of the first and second spacers is set in the range of 1:0.98 to 1:0.84. In this case, a pair of substrates 21 and 22 are pressed under predetermined pressure and fixed to each other with the sealing material 25. At this time, the substrates 21 and 22 are bent and the first spacer 23 suffers pressure deformation, and thus when the load is subsequently removed, the substrates 21, 22 and the spacer 23 are kept into close contact with each other by the repulsive force based on the elastic force of the spacer 23. Accordingly, the gap accuracy between the substrates is dependent on the unevenness of the surfaces of the substrates and thus the uniform gap can be formed, thereby enhancing the display contrast.

The second publication discloses the technique that a mixture of first soft particle having high elastic coefficient and second hard particle having low elastic coefficient is used as a spacer for a liquid crystal display device, so that uniform optical characteristics can be obtained over the overall surface without color irregularity and there is no limitation in usable temperature range. According to the second publication, in a liquid crystal display device, light-transmissible electrodes 32, 37 and oriented films 33, 38 are formed on light-transmissible substrates 31, 36, and the oriented films 33, 38 are disposed so as to confront each other slightly away from each other as shown in FIG. 2. Further, a sealing material 34 of epoxy resin film is formed on the peripheral portion of the liquid crystal display device so that thin gap 39 is formed between the two oriented films 33 and 38, and spacer 35 is scattered in the gap 39. The spacer 35 is made of the mixture of first soft particles having high elastic coefficient and second particles which are mixed by 10% or less of the particle amount of the first particles and is harder and lower in elastic coefficient than the first particles. Consequently, the cell gap length can be accurately controlled, uniform optical characteristics and no irregularity of colors can be obtained over the overall surface, and the usable temperature range can be widened.

However, the above conventional prior art has the following disadvantages:

A first disadvantage resides in that any of the above-described conventional techniques suffer degradation in pixel-based display quality because the gap control material is scattered in the display pixel portion of the liquid crystal panel for the following reason. A liquid crystal display panel for use in a projection type projector is required to be designed in a compact and highly fine structure, and thus the occupational area rate of the gap control material itself over one pixel approaches to 20%, resulting in dispersion of the display state between a pixel on which the gap control material exists and a pixel on which no gap control material exists. Further, in consideration of the shape of the gap control material, the gap control material existing in the pixel portion serves as a factor to disturb the orientation of the liquid crystal layer or scatter light incident to the pixel portion due to its optical characteristic.

A second disadvantage resides in that as described with reference to the first publication, the gap control material mixed in the sealing material is excessively pressed in the press step for the panel attachment to break the wiring pattern under the seal pattern, and if the wiring pattern under the seal pattern is designed in a multi layered wiring structure, the wires are short-circuited. This is because use of hard materials as the gap control material is more effective to enhance the uniformity of the gap, however, the hard materials are more liable to crush the wires.

SUMMARY OF THE INVENTION

An object of the present invention is to provide a liquid crystal display panel in which the panel gap is controlled, the process failure occurring in a seal press process can be reduced and the gap controllability can be enhanced by dispersing two kinds of gap control materials having different physical property values from each other into a sealing material on the outer periphery of the panel.

In order to attain the above object, according to the present invention, a liquid crystal display panel comprising first and second substrates which are spaced from each other at a predetermined gap, and a liquid crystal sealed in the gap between the pair of first and second substrates, which comprises a seal material which is applied on the outer periphery of the first and second substrates, and two kinds of gap control materials dispersed in the seal material.

In the above liquid crystal display panel, the two kinds of gap control materials consist of a first gap control material of particles softer than an insulating film (back film) and wires disposed on the first substrate, and a second gap control material of particles harder than the insulating film (back film) and wires disposed on the first substrate, and a maximum particle diameter in consideration of the standard deviation of the first gap control material is set to be larger than a maximum particle diameter in consideration of the standard deviation of the second gap control material.

In the above liquid crystal display panel, the relationship between an average ($x_1$) and standard deviation ($\sigma_1$) of the particle diameter of the first gap control material and an average ($x_2$) and standard deviation ($\sigma_2$) of the particle diameter of the second gap control material substantially satisfies the following formula:

$$(x_1+3\times\sigma_1)-(x_2+3\times\sigma_2)=\Delta h$$

wherein $\Delta h$ represents a differential height of said insulating film formed by said wires located under said seal material.

In the above liquid crystal display panel, the standard deviation of the second gap control material is set to the same level as or smaller level than the standard deviation of the first gap control material.

In the above liquid crystal display panel, the compressive elastic coefficient of the first gap control material is set in the range of $9.8\times10^8$ to $4.9\times10^9$ Pa (Pascal).

In the above liquid crystal display panel, the compressive elastic coefficient of the second gap control material is set in the range of $4.9\times10^9$ to $2.45\times10^{11}$ Pa (Pascal).

In the above liquid crystal display panel, the mixing rate of the second gap control material to the first gap control material is set in the range of about 0.1 time to about 2 times.

DETAILED DESCRIPTION OF THE PREFERRED EMBODIMENTS

Preferred embodiments according to the present invention will be described hereunder with reference to the accompanying drawings.

First Embodiment

Figure 1:
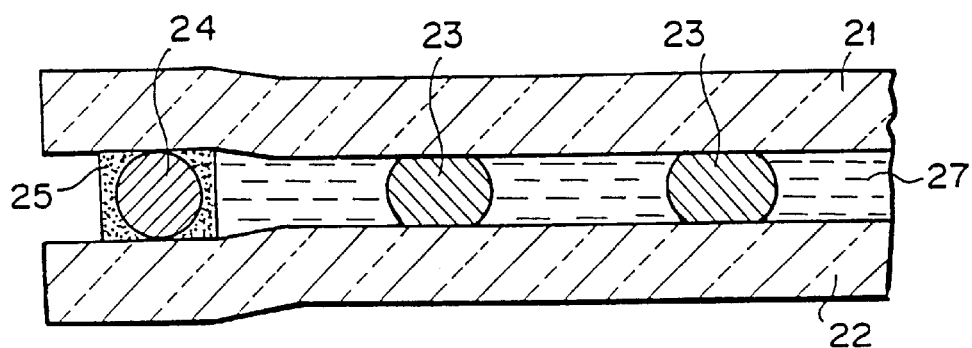
FIG. 1 is a cross-sectional view showing a conventional liquid crystal display panel.
Figure 2:
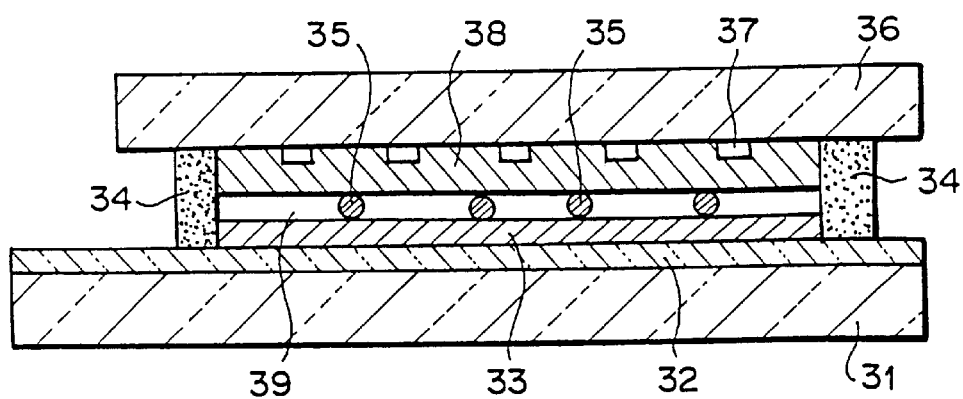
FIG. 2 is a cross-sectional view showing a another conventional liquid crystal display panel.
Figure 3:
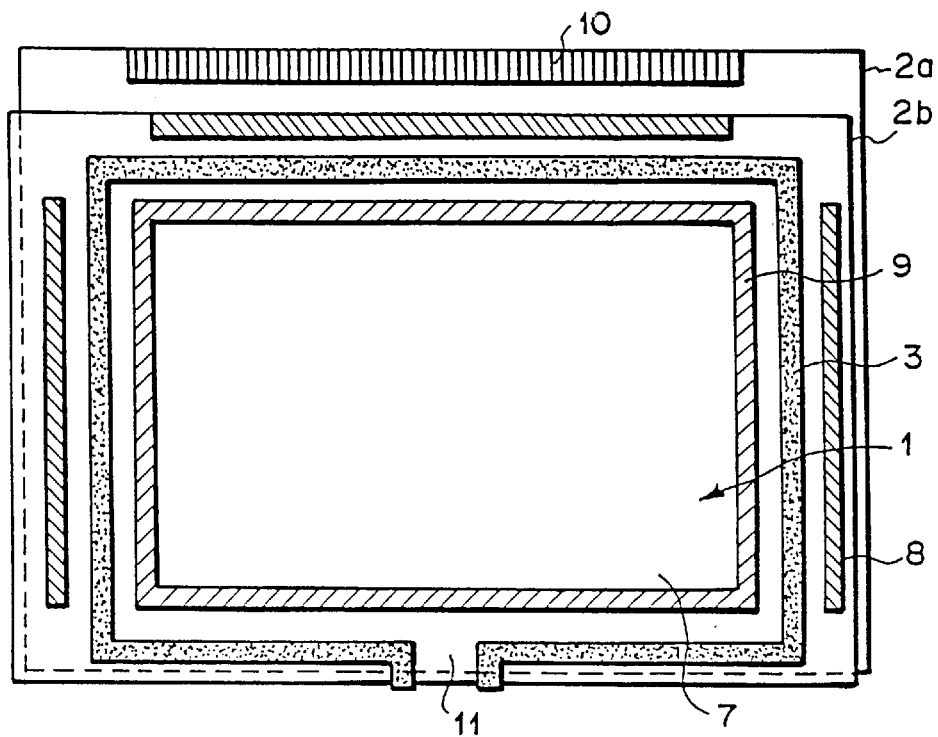
FIG. 3 is a plan view showing a liquid crystal display panel according to the present invention.

FIG. 3 is a schematic plan view showing a first embodiment of a liquid crystal display panel according to the present invention.

Liquid crystal display panel 1 is designed in such a structure that TFT substrate 2a and opposite substrate 2b are attached to each other by sealing material 3, and the outer dimension of the panel is set to 33.4 mm (width)×28.8 mm (height)×2.2 mm (thickness), for example. On the TFT substrate 2a, driver circuit portion 8 and external connection electrode 10 are formed at the outside of the sealing material 3 and light shielding layer 9 is formed at the inside of the sealing material 3. Further, a pixel area 7 is formed so as to be surrounded by the light shielding layer 9. On the opposite substrate 2b, the light shielding layer 9 is formed at the corresponding position to that of the TFT substrate 2a, and the outer dimension of the opposite substrate 2b is smaller than that of the TFT substrate by the amount corresponding to the outer connection electrode 10.

The pattern of the sealing material 3 has liquid crystal injection opening 11 having an opened lower portion through which the liquid crystal material is injected, and the pattern width of the sealing material 3 is set to 0.8 mm. Gap control material is dispersed in the sealing material 3, and the cell gap of the liquid crystal display panel 1 is controlled by only the gap control material dispersed in the sealing material 3 (no gap control material is scattered in the pixel area 7).

The respective dimensions as described above are examples, and thus the present invention is not limited to these dimensions. A light-transmissible type display panel and a light reflection type display panel are used as the liquid crystal display panel used for the liquid crystal projector, and any one of these types may be used in this embodiment. However, in the case of the TFT substrate for the reflection type display panel, it is not limited to transparent glass, but an opaque substrate may be used. The terms "spacer", "Micropearl" and "rod" have the same meaning for the gap control materials 4a, 4b. Any material may be used as the sealing material to be supplied to the periphery of the pixel area insofar as the liquid crystal can be sealed between substrates by the material and the material concerned can keep affinity to the gap control material.

Figure 4:
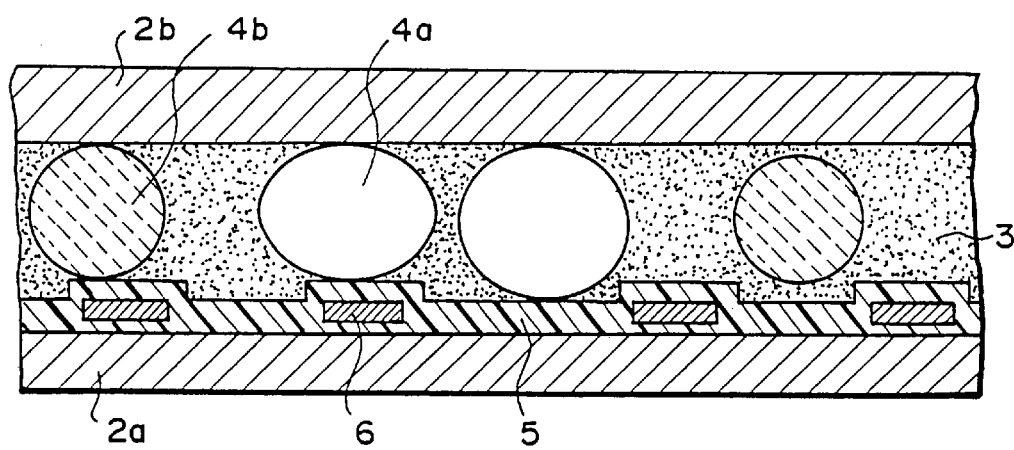
FIG. 4 is a cross-sectional view showing the periphery of a seal material at the peripheral portion of the liquid crystal display panel according to the present invention.

FIG. 4 is a cross-sectional view showing the structure of a seal pattern portion of the first embodiment of the liquid crystal display panel. The cell gap of the liquid crystal display panel is controlled by two kinds of gap control materials dispersed in the sealing material 3 which functions to attach the TFT substrate 2a and the opposite substrate 2b to each other. Driving wires 6 are formed on the surface of the TFT substrate 2a so as to traverse the sealing material 3 from the driver circuit portion 8 (shown in FIG. 3) to the display area 7 (shown in FIG. 3), and insulating film 5 for protecting the wires 6 is designed to be uneven in section.

With respect to the two kinds of gap control materials dispersed in the sealing material 3, the first gap control material 4a is softer and has a larger maximum particle diameter in consideration of the standard deviation than the second gap control material 4b. The first soft gap control material 4a is kept in contact with the opposite substrate 2a and the insulating film 5 while a part thereof is pressed and deformed by the projecting portions of the insulating film 5 and the other is kept substantially in a non-deformed state at the recess portions of the insulating film 5. On the other hand, a part of the second hard gap control material 4b is kept in contact with the opposite substrate 2b and the insulating film 5 at the projecting portions of the insulating film 5 so as to be substantially in a non-deformed state, and the other of the second hard gap control material 4b is kept in non-contact with opposite substrate 2b or the insulating film 5 (FIG. 4 shows the state that it is not brought into contact with them) at the recess portions of the insulating film 5 so as to be substantially in a non-deformed state.

Next, the method of controlling the gap of the liquid crystal display panel according to the present invention will be described in detail in connection with the materials and the manufacturing method.

As the first gap control material 4a were used spherical resin particles (average particle diameter: 3.5 μm, standard deviation of the particle diameter: 0.25 μm, trade name: Micropearl, produced by Sekisui Fine Chemical Co., Ltd.). The compressive elastic coefficient was equal to about $4.78 \times 10^9$ Pa (488 kgf/mm$^2$).

As the second gap control material 4b were used rod-shaped glass particles (average particle diameter: 3.55 μm, the standard deviation of the average particle diameter: 0.10 μm, trade name: Micro-rod, produced by Nippon Electric Glass Co., Ltd.). The compressive elastic coefficient was equal to about $8.53 \times 10^{10}$ Pa (8700 kgf/mm$^2$).

Ultraviolet hardening adhesive agent (trade name: 30Y-296G4, produced by Three Bond Co., Ltd.) was used as the sealing material 3. Aluminum of 0.4 cm in thickness was formed as the wires 6 and inorganic materials of a nitride film and an oxide film were formed at a total thickness of 1.2 μm as the insulating film in the neighborhood of the seal portion for controlling the gap of the TFT substrate 2a. On the other hand, no film forming process was carried out in the neighborhood of the seal portion for controlling the gap of the opposite substrate 2b.

The supply of the sealing material 3 was carried out as follows: The first gap control material 4a of 2 wt % (2 weight percentage)and the second gap control material 4b of 1 wt % with respect to the sealing material 3 were mixed and dispersed into the sealing material 3, and the mixture thus obtained was patterned onto the TFT substrate 2a by a dispenser system.

Subsequently, the TFT substrate 2a to which the sealing material 3 is supplied and the opposite substrate 2b were positioned and attached to each other, and ultraviolet rays of 4000 mJ/cm$^2$ (λ=365 nm) were irradiated to the laminate thus formed under such pressure that the distance from the projecting portions of the insulating film 5 formed on the TFT substrate 2a to the opposite substrate 2b (the cell gap in the sealing material 3) was equal to 3.85 μm as a design value, thereby hardening the sealing material and thus attaching these substrates. Thereafter, TN(Twisted-Nematic)-based liquid crystal material was injected from the liquid crystal injection opening 11 of the seal pattern, and the liquid crystal injection opening 11 was sealed by UV-hardenable type sealing adhesive agent.

The liquid crystal display panel thus completed could suppress the standard deviation from the design value of the liquid crystal cell gap to 0.08 μm or less, and also it could prevent occurrence of deficiencies such as wire breaking due to the press of the gap control materials 4a, 4b. The reason is as follows: Under the state that the sealing material is hardened with the pressure from the upper and lower sides of the TFT substrate 2a and opposite substrate 2b to control the panel gap, the particles of the first gap control material 4a are easily crushed in accordance with the step of the back film formed on the glass substrate because the first gap control material 4a is soft and has the average particle diameter larger than the second gap control material 4b, and most of all the first gap control material 4a contribute to the gap control while they are brought into contact with the substrates at the interfaces.

On the other hand, the second gap control material 4b is hard and has an average particle diameter smaller than the first gap control material 4a. Therefore, only the particles which come into contact with the projecting portions of the insulating film 5 contribute to the gap control. The projecting portions of the insulating film 5 caused by the wires 6 formed on the TFT substrate 2a or the steps of the back film of the insulating film 5.

As a comparative example to be compared with the first embodiment 1 of the liquid crystal display panel, there was prepared a sample in which only rod-shaped glass particles (hard gap control material shown in this embodiment) of 1 wt % with respect to the sealing material 3 was dispersed in the sealing material 3 as the gap control material 4. It could suppress the standard deviation from the design value of the liquid crystal cell gap to 0.08 μm or less, however, the wiring cut deficiencies due to the press of the gap control material 4 occurred. Further, there was prepared a sample in which only spherical resin particles (soft gap control material shown in this embodiment) of 2 wt % with respect to the sealing material 3 was dispersed in the sealing material 3 as the gap control material 4, however, there was not obtained any press condition satisfying that the standard deviation from the design value of the liquid crystal cell gap was equal to 0.08 μm or less.

In the above embodiment, the first gap control material 4a was formed of the spherical resin particles having the average particle diameter of 3.5 μm, the standard deviation of 0.25 μm and the compressive elastic coefficient of about $4.78 \times 10^9$ Pa (488 kgf/mm2), the second gap control material 4b was formed of rod-shaped glass particles having the average particle diameter of 3.55 μm, the standard deviation of 0.10 μm and the compressive elastic coefficient of about $8.53 \times 10^{10}$ Pa (8700 kgf/mm2), and the first gap control material 4a and the second gap control material 4b were dispersed in the mixing ratio of 2 wt %:1 wt % with respect to the sealing material 3 in the sealing material 3. However, the present invention is not limited to the above embodiment, and the same effect as the above embodiment can be obtained under the condition that the compressive elastic coefficient of the first gap control material 4a ranges from $9.8 \times 10^8$ to $4.9 \times 10^9$ Pa (100 to 500 kgf/mm$^2$), the compressive elastic coefficient of the second gap control material 4b ranges from $4.9 \times 10^9$ to $2.45 \times 10^{11}$ Pa (500 to 25000 kg/mm$^2$), the standard deviation of the particle diameter of the second gap control material 4b is equal to or smaller than the standard deviation of the first gap control material 4a, and the mixing ratio of the gap control materials is set so that the mixing ratio of the second gap control material to the first gap control material is set in the range of about 0.1 time to about 2 times.

Next, the principle of the gap control for the liquid crystal display panel of the present invention will be described.

Figure 5:
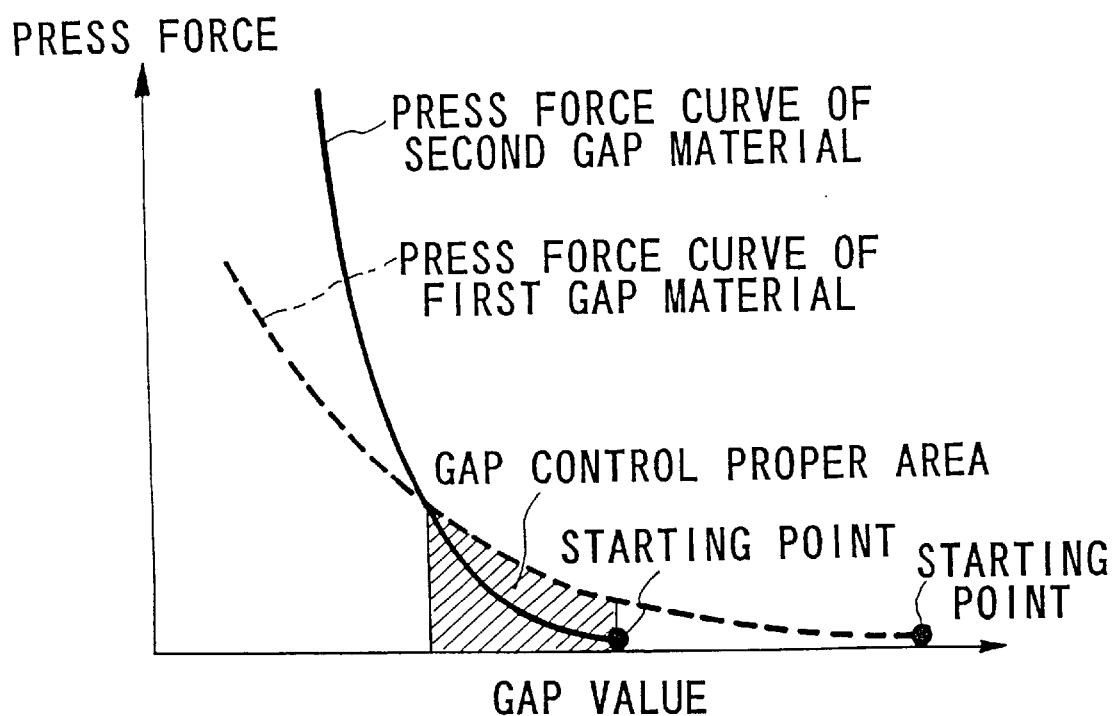
FIG. 5 is a graph showing the relationship between the gap value of a gap control material used in the liquid crystal display panel of the present invention and the press force.

FIG. 5 is a graph showing the relationship between the substantial panel gap value and press force required to control the gap control material for the two kinds of gap control materials of the liquid crystal display panel of the present invention. The press force curve of the first gap control material more moderately rises up with the variation of the gap value because the gap control material is formed of soft material. On the other hand, the press force curve of the second gap control material more sharply rises up with the variation of the gap value because the gap control material is formed of hard material. The start point indicating the rise-up of the press force curve of the gap control material is determined by the average particle diameter and standard deviation of the gap control material. That is, as the average particle diameter is large or the standard deviation is large, the gap value is increased. Further, as the standard deviation of the gap control material is reduced, the press force curve of the gap control material rises up more sharply.

In consideration of the above characteristics, the proper area for the gap control shown in FIG. 5 is set so that the upper limit of the gap value is set to an starting point at which the second hard gap control material 4b contributes to the press force, and the lower limit of the gap value is set to a point at which the second gap control material 4b has no domination to the first gap control material 4a with respect to the press force.

Therefore, the selection of the average particle diameter and standard deviation of the first gap control material 4a and second gap control material 4b is determined by the wires 6 formed on the TFT substrate 2a or the steps of the back film such as the insulating film 5. When the steps of the back film are large, the difference in average particle diameter between the first and second gap control materials is set to be large. When the steps of the back film are small, the difference in average particle diameter between the first and second gap control materials is set to be small. With respect to the second hard gap control material, the gap proper area viewed from the viewpoint of the gap value can be narrowed by reducing the standard deviation of the second hard gap control material as much as possible, whereby the panel gap can be controlled with high precision.

According to the principle of the gap control described above, it is the optimum condition that the following relating equation is satisfied in the relationship among the average ($x_1$) and standard deviation ($\sigma^1$) of the particle diameter of the first gap control material 4a, the average ($x_2$) and standard deviation ($\sigma^2$) of the particle diameter of the second gap control material 4b and the differential height ($\Delta h$) of the insulating film 5 formed by the wires 6 located under the sealing material 3 of the liquid crystal display panel:

$$(x_1+3\times\sigma_1)-(x_2+3\times\sigma_2)=\Delta h$$

For example, when the first gap control material 4a of the this embodiment is formed of spherical resin particles having an average particle diameter of 3.5 μm and a standard deviation of 0.25 μm and has a compressive elastic coefficient of about $4.78\times10^9$ Pa (488 kgf/mm²) while the second gap control material 4b is formed of rod-shaped glass particles having an average particle diameter of 3.55 μm and a standard deviation of 0.10 μm and has a compressive elastic coefficient of about $8.53\times10^{10}$ Pa (8700 kgf/mm²), $$\Delta h=(3.5+3\times0.25)-(3.55+3\times0.10)=0.4$$

Since the insulating film 5 is formed at a thickness of 1.2 μm so as to be substantially uniform in thickness over the overall surface of the pattern area in the neighborhood of the seal portion, the step amount ($\Delta h$) of the this embodiment is substantially equal to the thickness of the wires 6 (0.4 μm).

[Second Embodiment]

A second embodiment according to the present invention will be described. The second embodiment of the liquid crystal display panel of the present invention has the same panel construction as the first embodiment, is manufactured in the same manufacturing method as the first embodiment, and thus only the materials to be used will be described. This embodiment will be described with reference to the plan view of FIG. 3 and the cross-sectional view of FIG. 4.

First, the first gap control material 4a was formed of spherical resin particles having an average particle diameter of 3.6 μm and a standard deviation of 0.25 μm (trade name: Micropearl, produced by Sekisui Fine Chemical Co., Ltd.), and the compressive elastic coefficient thereof was equal to about $4.78\times10^9$ Pa (488 kgf/mm²).

As the second gap control material 4b were used spherical silica particles having an average particle diameter of 3.8 μm and a standard deviation of 0.06 μm (trade name: "SINSIKYU"—S W, produced by SHOKUBAI KASEI Co., Ltd.). The compressive elastic coefficient was estimated to be equal to about $2.45\times10^{10}$ Pa (2500 kg/mm²).

Ultraviolet hardening adhesive agent (trade name: 30 Y-296 G4, produced by Three Bond Co., Ltd.) was used as the sealing material 3. Aluminum of 0.4 μm in thickness was formed as the wires 6 and inorganic materials of a nitride film and an oxide film were formed at a total thickness of 1.2 μm as the insulating film in the neighborhood of the seal portion for controlling the gap of the TFT substrate 2a. On the other hand, no film forming process was carried out in the neighborhood of the seal portion for controlling the gap of the opposite substrate 2b.

The supply of the sealing material 3 was carried out as follows: The first gap control material 4a of 1.5 wt % and the second gap control material 4b of 1.5 wt % with respect to the sealing material 3 were mixed and dispersed into the sealing material 3, and the mixture thus obtained was patterned onto the TFT substrate 2a by a dispenser system.

Subsequently, the TFT substrate 2a to which the sealing material 3 is supplied and the opposite substrate 2b were positioned and attached to each other, and ultraviolet rays of 4000 mJ/cm² (λ=365 nm) were irradiated to the laminate thus formed under such pressure that the distance from the projecting portions of the insulating film 5 formed on the TFT substrate 2a to the opposite substrate 2b (the cell gap in the sealing material 3) was equal to 3.95 μm as a design value, thereby hardening the sealing material and thus attaching these substrates. Thereafter, TN-based liquid crystal material was injected from the liquid crystal injection opening of the seal pattern, and the liquid crystal injection opening 11 was sealed by UV-hardenable type sealing adhesive agent.

The liquid crystal display panel thus completed could suppress the standard deviation from the design value of the liquid crystal cell gap to 0.08 μm or less, and also it could prevent occurrence of deficiencies such as wire breaking due to the press of the gap control materials 4a, 4b.

In the above embodiment, the first gap control material 4a was formed of the spherical resin particles having the average particle diameter of 3.6 cm, the standard deviation of 0.25 μm and the compressive elastic coefficient of about $4.78\times10^9$ Pa (488 kgf/mm²), the second gap control material 4b was formed of spherical silica particles having the average particle diameter of 3.8 cm, the standard deviation of 0.06 μm and the compressive elastic coefficient of about $2.45\times10^{10}$ Pa (2500 kg/mm²), and the first gap control material 4a and the second gap control material 4b were dispersed in the mixing ratio of 1.5 wt %:1.5 wt % with respect to the sealing material 3 in the sealing material 3. However, the present invention is not limited to the above embodiment, and the same effect as the above embodiment can be obtained under the condition that the compressive elastic coefficient of the first gap control material 4a ranges from 9.8×10⁸ to 4.9×10⁹ Pa (100 to 500 kgf/mm²), preferably ranges from 1.96×10⁹ to 3.92×10⁹ (200 to 400 kgf/mm²), the compressive elastic coefficient of the second gap control material 4b ranges from 4.9×10⁹ to 2.45×10¹¹ Pa (500 to 25000 kgf/mm²), preferably ranges from 4.9×10⁹ to 1.96 ×10¹¹ Pa (500 to 20000kgf/mm²), the standard deviation of the particle diameter of the second gap control material 4b is equal to or smaller than the standard deviation of the particle diameter of the first gap control material 4a, and the mixing ratio of the gap control materials is set so that the mixing ratio of the second gap control material 4b to the first gap control material 4a is set in the range of about 0.1 time to about 2 times.

In the above embodiments, the liquid crystal display panel has a pixel display area of about 1.3 inches. However, if the malleability of the two substrates is small, the present invention may be applied to a panel of several inches. Further, the liquid crystal material is formed of TN type, however, STN type or ferroelectric type may be used. That is, the liquid crystal material is not limited to special materials.

According to the liquid crystal display panel of the present invention, excessive load by the gap control material can be prevented from being imposed on the back film, the wires, or the like formed on the substrate, and the uniform load dispersion can be performed in the seal pattern. Therefore, the display quality can be prevented from being degraded due to reflection of the gap control materials dispersed in the display portion area, and the breaking of the wiring portion or the short-circuiting of the multi layered wires can be prevented, so that a high-quality compact and highly accurate panel can be achieved.

Further, in the liquid crystal display panel for use in the projection type projector, there can be prevented occurrence of the color irregularity due to the dispersion of the panel gap when displays of RGB in the three-plate projection type projector are combined.

What is claimed is:

1. A liquid crystal display, comprising first and second substrates which are spaced from each other at a predetermined gap, and a liquid crystal sealed in the gap between the pair of first and second substrates, which comprises a seal material which is applied on the outer periphery of said first and second substrates, and two kinds of gap control materials dispersed in said seal material;

wherein said two kinds of gap control materials consist of a first gap control material of particles softer than an insulating film and wires disposed on said first substrate, and a second gap control material of particles harder than said insulating film and wires disposed on said first substrate, and a maximum particle diameter in consideration of the standard deviation of said first gap control material is set to be larger than a maximum particle diameter in consideration of the standard deviation of said second gap control material.

2. The liquid crystal display as claimed in claim 1, wherein the relationship between an average ($x_1$) and standard deviation ($\sigma_1$) of the particle diameter of said first gap control material and an average ($x_2$) and standard deviation ($\sigma_2$) of the particle diameter of said second gap control material substantially satisfies the following formula:

$$(x_1+(3\times\sigma_1))-(x_2+(3\times\sigma_2))=\Delta h$$

wherein $\Delta h$ represents a differential height of said insulating film formed by said wires located under said seal material.

3. A liquid crystal display, comprising first and second substrates which are spaced from each other at a predetermined gap, and a liquid crystal sealed in the gap between the pair of first and second substrates, which comprises a seal material which is applied on the outer periphery of said first and second substrates, and two kinds of gap control materials dispersed in said seal material;

wherein said two kinds of gap control materials consist of a first gap control material of particles softer than an insulating film and wires disposed on said first substrate, and a second gap control material of particles harder than said insulating film and wires disposed on said first substrate, and a maximum particle diameter in consideration of the standard deviation of said first gap control material is set to be larger than a maximum particle diameter in consideration of the standard deviation of said second gap control material, and wherein the standard deviation of said second gap control material is set to the same level as or smaller than the standard deviation of said first gap control material.

4. A liquid crystal display, comprising first and second substrates which are spaced from each other at a predetermined gap, and a liquid crystal sealed in the gap between the pair of first and second substrates, which comprises a seal material which is applied on the outer periphery of said first and second substrates, and two kinds of gap control materials dispersed in said seal material;

wherein said two kinds of gap control materials consist of a first gap control material of particles softer than an insulating film and wires disposed on said first substrate, and a second gap control material of particles harder than said insulating film and wires disposed on said first substrate, and a maximum particle diameter in consideration of the standard deviation of said first gap control material is set to be larger than a maximum particle diameter in consideration of the standard deviation of said second gap control material, and wherein the relationship between an average ($x_1$) and standard deviation ($\sigma_1$) of the particle diameter of said first gap control material and an average ($x_2$) and standard deviation ($\sigma_2$) of the particle diameter of said second gap control material substantially satisfies the following formula:

$$(x_1+(3\times\sigma_1))-(x_2+(3\times\sigma_2))=\Delta h$$

wherein $\Delta h$ represents a differential height of said insulating film formed by said wires located under said seal material; and wherein the standard deviation of said second gap control material is set to the same level as or smaller level than the standard deviation of said first gap control material.

5. A liquid crystal display, comprising first and second substrates which are spaced from each other at a predetermined gap, and a liquid crystal sealed in the gap between the pair of first and second substrates, which comprises a seal material which is applied on the outer periphery of said first and second substrates, and two kinds of gap control materials dispersed in said seal material;

wherein said two kinds of gap control materials consist of a first gap control material of particles softer than an insulating film and wires disposed on said first substrate, and a second gap control material of particles harder than said insulating film and wires disposed on said first substrate, and a maximum particle diameter in consideration of the standard deviation of said first gap control material is set to be larger than a maximum particle diameter in consideration of the standard deviation of said second gap control material, and wherein the compressive elastic coefficient of said first gap control material is set in the range of $9.8 \times 10^8$ to $4.9 \times 10^9$ Pa.

6. A liquid crystal display, comprising first and second substrates which are spaced from each other at a predetermined gap, and a liquid crystal sealed in the gap between the pair of first and second substrates, which comprises a seal material which is applied on the outer periphery of said first and second substrates, and two kinds of gap control materials dispersed in said seal material;

wherein said two kinds of gap control materials consist of a first gap control material of particles softer than an insulating film and wires disposed on said first substrate, and a second gap control material of particles harder than said insulating film and wires disposed on said first substrate, and a maximum particle diameter in consideration of the standard deviation of said first gap control material is set to be larger than a maximum particle diameter in consideration of the standard deviation of said second gap control material, and wherein the compressive elastic coefficient of said second gap control material is set in the range of $4.9 \times 10^9$ to $2.45 \times 10^{11}$ Pa.

7. The liquid crystal display panel as claimed in claim 1, wherein the mixing rate of said second gap control material to said first gap control material is set in the range of about 0.1 time to about 2 times.

8. The liquid crystal display panel as claimed in claim 6, wherein the mixing rate of said second gap control material to said first gap control material is set in the range of about 0.1 time to about 2 times.

9. The liquid crystal display panel as claimed in claim 8, wherein the compressive elastic coefficient of said first gap control material is set in the range of $9.8 \times 10^8$ to $4.9 \times 10^9$ Pa.

10. The liquid crystal display panel as claimed in claim 8, wherein the compressive elastic coefficient of said second gap control material is set in the range of $4.9 \times 10^9$ to $2.45 \times 10^{11}$ Pa.

* * * * *